(12) United States Patent
Marur

(10) Patent No.: US 7,537,261 B1
(45) Date of Patent: May 26, 2009

(54) VEHICLE SEAT LOWERING APPARATUS

(75) Inventor: Prabhakar Marur, Bangalore (IN)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/127,156

(22) Filed: May 27, 2008

(51) Int. Cl.
*B60N 2/42* (2006.01)
(52) U.S. Cl. .................................. 296/65.18
(58) Field of Classification Search ............. 296/65.18; 297/216.1, 216.16, 216.19, 216.2; 280/5.502; 180/282
See application file for complete search history.

(56) References Cited

U.S. PATENT DOCUMENTS

| | | | | |
|---|---|---|---|---|
| 4,738,485 A | * | 4/1988 | Rumpf | 297/216.19 |
| 5,125,472 A | * | 6/1992 | Hara | 180/271 |
| 5,149,165 A | * | 9/1992 | Woolley | 296/68.1 |
| 5,492,368 A | | 2/1996 | Pywell et al. | |
| 6,155,601 A | * | 12/2000 | Cantor et al. | 280/806 |
| 6,182,783 B1 | * | 2/2001 | Bayley | 180/282 |
| 6,637,816 B2 | * | 10/2003 | Pavlov et al. | 297/216.2 |
| 6,683,430 B2 | * | 1/2004 | Pavlov et al. | 318/466 |
| 6,720,750 B2 | * | 4/2004 | Stachowski et al. | 318/466 |
| 7,195,092 B2 | * | 3/2007 | Wu et al. | 180/282 |
| 7,278,682 B2 | * | 10/2007 | Friedman et al. | 297/216.1 |
| 7,387,184 B2 | * | 6/2008 | Bethge et al. | 180/282 |

* cited by examiner

*Primary Examiner*—H Gutman

(57) ABSTRACT

A vehicle includes a vehicle body having a roof and a floor. A seat assembly has a lower seat portion and a seatback portion operatively connected to the lower seat portion. The seat assembly is mounted with respect to the floor and is selectively movable from a first position to a second position. The seat assembly in the second position is farther from the roof than in the first position. At least one actuator is operatively connected to the seat assembly and is selectively activatable to cause the seat assembly to move from the first position to the second position. A rollover detection system is operatively connected to the actuator. The rollover detection system is also configured to detect at least one condition indicative of a vehicle rollover, and to activate the actuator in response to the at least one condition indicative of a vehicle rollover.

9 Claims, 2 Drawing Sheets

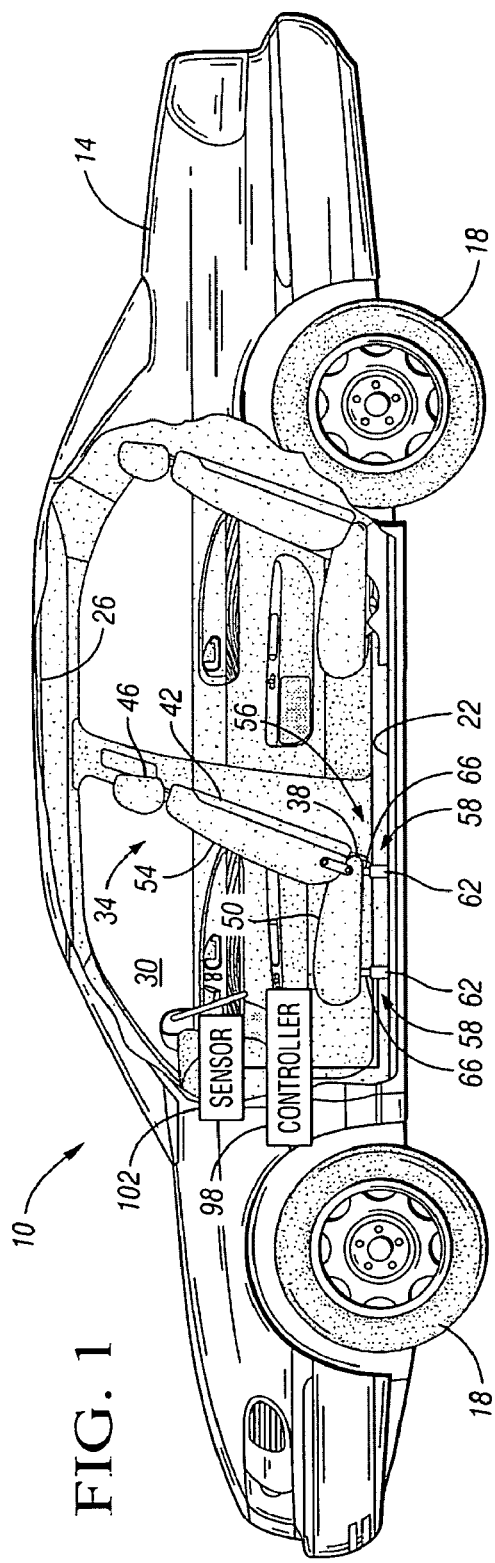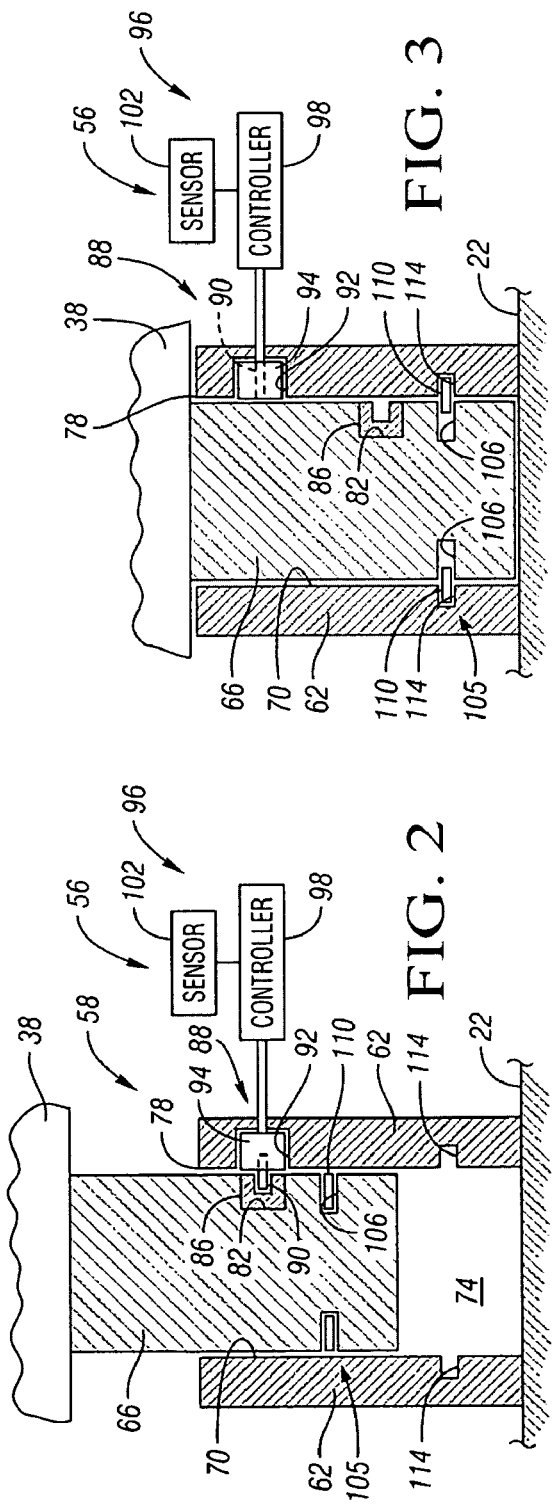

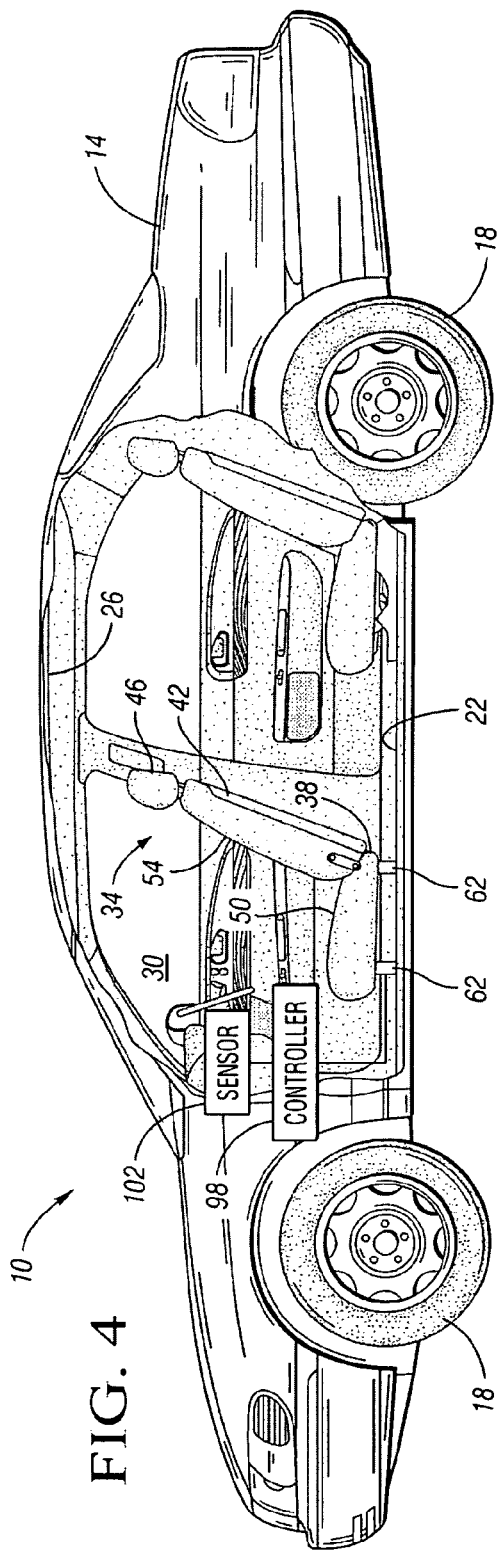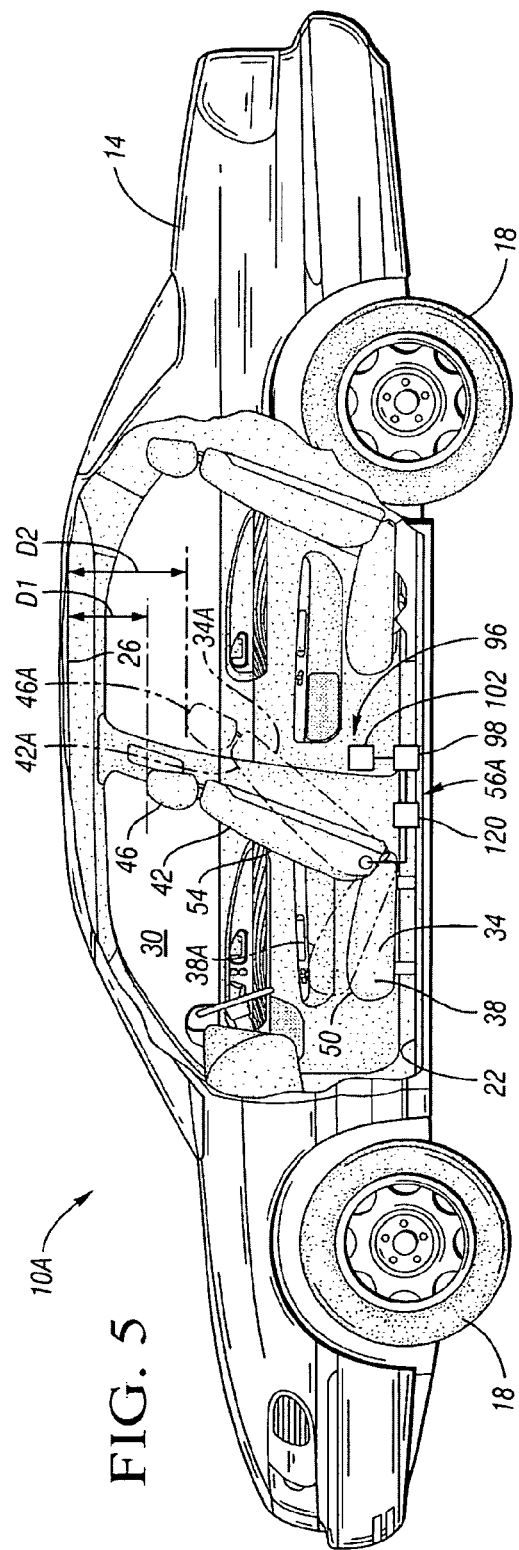

VEHICLE SEAT LOWERING APPARATUS

TECHNICAL FIELD

This invention relates to vehicle seat assemblies.

BACKGROUND OF THE INVENTION

Vehicles include seat assemblies to support occupants within a passenger compartment. A seat assembly typically includes a lower seat portion, which presents a generally horizontal surface for supporting an occupant above the vehicle floor. A seatback portion is typically mounted with respect to the lower seat portion and presents a generally vertical surface for supporting the back of an occupant. Often, the seatback portion is selectively pivotable so that the reclination angle of the occupant is selectively adjustable. A seat assembly is typically mounted to the floor of the vehicle by rails or tracks so that the position of the seat assembly is selectively adjustable.

SUMMARY OF THE INVENTION

A vehicle includes a vehicle body having a roof and a floor. A seat assembly has a lower seat portion and a seatback portion operatively connected to the lower seat portion. The seat assembly is mounted with respect to the floor and is selectively movable from a first position to a second position. The seat assembly in the second position is farther from the roof than in the first position. At least one actuator is operatively connected to the seat assembly and is selectively activatable to cause the seat assembly to move from the first position to the second position. A rollover detection system is operatively connected to the actuator. The rollover detection system is configured to detect at least one condition indicative of a vehicle rollover, and to activate the actuator in response to the at least one condition indicative of a vehicle rollover.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic, partial cutaway, side view of a vehicle including a seat assembly supported by a plurality of struts in an elevated position;

FIG. 2 is a schematic, cross-sectional, side view of one of the struts of FIG. 1 when the seat assembly is in the elevated position;

FIG. 3 is a schematic, cross-sectional, side view of the strut of FIG. 2 when the seat assembly is in a lowered position;

FIG. 4 is a schematic, partial cutaway, side view of the vehicle of FIG. 1 with the seat assembly in the lowered position; and FIG. 5 is a schematic, partial cutaway, side view of a vehicle with a seat assembly being selectively rotatable between an elevated position and a lowered position.

DESCRIPTION OF THE PREFERRED EMBODIMENTS

Referring to FIG. 1, a vehicle 10 includes a vehicle body 14. As understood by those skilled in the art, the vehicle body 14 is rotatably supported above the ground by a plurality of wheels 18. The vehicle body 14 includes a floor 22 and a roof 26, which cooperate to partially define a passenger compartment 30. A seat assembly 34 is positioned within the passenger compartment 30 and includes a lower seat portion 38, a seatback portion 42, and a head restraint 46. The lower seat portion 38 defines a generally horizontally-oriented, upwardly-facing surface 50 for supporting an occupant of the vehicle 10 above the floor 22. The seatback portion 42 is mounted with respect to the lower seat portion 38; the seatback portion 42 may be rigidly mounted with respect to the lower seat portion 38, or pivotably mounted with respect to the lower seat portion 38 such that an occupant can selectively adjust the angle formed between the seatback portion 42 and the lower seat portion 38, as understood by those skilled in the art. The seatback portion 42 defines a generally vertically-oriented surface 54 for supporting the back of an occupant. The head restraint 46 in the embodiment depicted is mounted to the seatback portion 42 and defines the upper extent of the seat assembly 34.

The vehicle 10 includes a seat lowering apparatus 56, which includes a plurality of telescopic strut assemblies 58. The strut assemblies 58 operatively interconnect the seat assembly 34 and the floor 22 and are configured to selectively guide movement of the seat assembly 34 between an elevated position, as shown in FIG. 1, and a lowered position, as shown in FIG. 4. Two strut assemblies 58 are shown in FIG. 1; however, at least three strut assemblies 58 are preferably employed to provide stability to the seat assembly 34. Each strut assembly 58 includes a respective first member 62 mounted with respect to the floor 22 and a respective second member 66 mounted with respect to the lower seat portion 38.

FIGS. 2 and 3 are schematic depictions of one of the strut assemblies 58, which is representative of all of the strut assemblies 58. Referring to FIGS. 2 and 3, in the embodiment depicted, the first member 62 is tubular, having an inner surface 70 that defines a cylindrical chamber 74. The cylindrical chamber 74 is characterized by an opening 78 at the upper end of the first member 62.

The second member 66 in the embodiment depicted is a cylindrical rod. The second member 66 is mounted to the lower surface of the lower seat portion 38, and extends through the opening 78 to be partially contained within the chamber 74. The second member 66 is selectively vertically movable in the chamber 74 with respect to the first member 62. The second member 66 has a diameter slightly smaller than the inner diameter of the first member 62 such that the inner surface 70 of the first member 62 acts on the second member 66 to restrict relative movement of the second member 66 with respect to the first member 62 to vertical translation. The second member 66 is selectively translatable with respect to the first member 62 between a first position, as shown in FIG. 2, and a second position, as shown in FIG. 3. When the second member 66 is in its first position, the seat assembly 34 is in its elevated position. When the second member 66 is in its second position, the seat assembly 34 is in its lowered position.

The second member 66 defines a cavity 82. A linear bearing 86 is mounted to the second member 66 inside the cavity 82. Each strut assembly 58 includes a retention device 88 that is characterized by an engaged configuration and a disengaged configuration. In the engaged configuration, as shown in FIG. 2, the retention device 88 prevents relative movement between the first and second members 62, 66 and thereby maintains or supports the seat assembly 34 in its elevated position. In the disengaged configuration, as shown in FIG. 3, the retention device 88 does not prevent relative movement between the first and second members 62, 66 and thus the seat assembly 34 is movable from its elevated position to its lowered position.

In the embodiment depicted, the retention device 88 includes a pin 90 that is mounted with respect to the first member 62 and is configured to selectively interconnect the first and second members 62, 66 to restrict relative movement therebetween. The first member 62 defines a cavity 92 that is open to the cylindrical chamber 74. The retention device 88 also includes an actuator 94, which, in the embodiment depicted, is mounted to the first member 62 inside cavity 92. Those skilled in the art will recognize a variety of actuator configurations that may be employed within the scope of the claimed invention, such as solenoids, servomotors, pyrotechnic actuators, etc.

The actuator 94 is configured to, when activated, move the pin 90 from an extended position, as shown in FIG. 2, to a retracted position, as shown in FIG. 3. In the extended position, the pin 90 extends from cavity 92 into chamber 74. The cavity 82 of the second member 66 and the linear bearing 86 are positioned to receive the pin 90 when the seat assembly 34 is in the elevated position, as shown in FIG. 2. Thus, when the seat assembly 34 is in the elevated position and the pin 90 is in the extended position, the pin 90 locks the second member 66 with respect to the first member 62 and thereby maintains or supports the seat assembly 34 in its elevated position. In the retracted position, the pin 90 does not extend into the cavity 82, and thus the pin 90 does not prevent relative movement between the first and second members 62, 66, and therefore the seat assembly 34 is movable from its elevated position to its lowered position. Once the pin 90 is in its retracted position, gravity or other forces cause the seat assembly 34 to move to its lowered position. Thus, activation of each actuator 94 causes the seat assembly 34 to move from the elevated position to the lowered position.

In the embodiment depicted, each strut assembly 58 includes a respective retention device 88 with a corresponding actuator 94. However, other configurations may be employed within the scope of the claimed invention. For example, only one of the strut assemblies 58 may employ a retention device 88 to support the seat assembly 34 in the elevated position, a single actuator may be employed to release several retention devices, etc.

The vehicle 10 includes a rollover detection system 96 having a controller 98 and at least one sensor 102. The rollover detection system 96 is configured to detect at least one condition indicative of a vehicle rollover and to cause each actuator 94 to move each pin 90 from the extended position to the retracted position in response to detecting at least one condition that is indicative of a vehicle rollover.

More specifically, in the embodiment depicted, the controller 98 is operatively connected to the actuator 94 and is configured to selectively cause the actuator 94 to move the pin 90 to its retracted position. The sensors 102 are configured to monitor conditions of the vehicle body 14 and to transmit sensor signals indicative of the conditions to the controller 98. Exemplary sensors 102 include accelerometers configured to monitor lateral acceleration of the vehicle body 14, inclinometers, etc.

The controller 98 is configured to analyze the sensor signals according to a preprogrammed algorithm to determine whether the conditions monitored by sensors 102 are indicative of a vehicle rollover condition. For example, and within the scope of the claimed invention, a condition indicative of a vehicle rollover includes a displacement variable of the vehicle body 14, or derivatives or integrals thereof, exceeding a predetermined amount. Exemplary displacement variables may include, within the scope of the claimed invention, lateral acceleration of the vehicle body 14, angle of the vehicle floor 22 with respect to horizontal, the rotational velocity of the vehicle body 14, etc. The controller 98 is configured to activate each actuator 94 by transmitting a control signal to each actuator 94 if the controller 98 determines that at least one condition indicative of a vehicle rollover is present. The actuator 94 is configured to move the pin 90 from the extended position to the retracted position in response to the control signal from the controller 98. Accordingly, the seat lowering mechanism 56 causes the seat assembly 34 to move away from the roof 26 in the event of a rollover of the vehicle 10, thereby increasing the distance between the seat assembly 34 and the roof 26.

The seat lowering apparatus 56 in the embodiment depicted also includes retention device 105, which is configured to automatically lock the second member 66 and the first member 62 when the seat assembly 34 is moved into its lowered position, and thereby lock the seat assembly 34 in its lowered position. In the embodiment depicted, the second member 66 defines a groove 106 that is open in the direction of the inner surface 70 of member 62. The retention device 105 includes a split ring 110 that is at least partially contained within the groove 106. When the seat assembly 34 is in the elevated position, the ring 110 is elastically deformed and acts against the inner surface 70 of member 62. The first member 62 defines a groove 114 that is sufficiently positioned to receive a portion of the split ring 110 when the seat assembly is in its lowered position, as shown in FIG. 3. Thus, with the ring 110 extending from groove 106 to groove 114, the ring 110 locks the member 62 and member 66 together, and thereby locks the seat assembly 34 in its lowered position.

It should be noted that the strut assemblies 58 are shown directly interconnecting the lower seat portion 38 and the floor 22; however, and within the scope of the claimed invention, other devices may also be intermediate the seat assembly 34 and the floor 22. For example, a seat adjustment mechanism (not shown), such as rails to permit selective fore and aft movement of the seat assembly 34 and other devices to permit selective up and down adjustment of the seat assembly 34 by an occupant, may be mounted to the underside of the lower seat portion 38; the strut assemblies 58 may then interconnect the adjustment mechanism and the floor 22. It should also be noted that, in the embodiment depicted, the entire seat assembly 34, including the lower seat portion 38, the seatback portion 42, and the head restraint 46, translates when the pin 90 is moved from its extended position to its retracted position, and thus all parts of the lower seat portion 38, the seatback portion 42, and the head restraint 46 are farther from the roof 26 when the seat assembly 34 is in the lowered position than when the seat assembly 34 is in the elevated position.

Referring to FIG. 5, wherein like reference numbers refer to like components from FIGS. 1-4, vehicle 10A includes an alternative seat lowering apparatus 56A. Seat lowering apparatus 56A includes an actuator 120 that is configured to exert a force on the seat assembly 34 to rotate the seat assembly 34 from a first position, shown at 34, to a second position, shown in phantom at 34A. Thus, actuator 120 is configured to rotate the lower seat portion from the position shown at 38 to the position shown in phantom at 38A; the seatback portion from the position shown at 42 to the position shown in phantom at 42A; and the head restraint from the position shown at 46 to the position shown in phantom at 46A.

When the seat assembly 34 is in the first position, the distance between the seat assembly 34 and the roof 26 is D1. When the seat assembly is rotated to the second position at 34A, the distance between the seat assembly and the roof 26 is D2. D2 is greater than D1, and thus rotation of the seat assembly 34 to its second position increases clearance between the seat assembly 34 and the roof 26. The vehicle includes rollover detection system 96, which includes controller 98 and sensors 102. The controller 98 is configured to transmit a command signal to the actuator 120 when the system 96 detects at least one condition indicative of a vehicle rollover. The actuator 120 is responsive to the command signal from the controller 98 to move the seat assembly from the first position to the second position.

It may be desirable for the rollover detection system 96 to be configured to move the pin 90 or activate actuator 120 only when all of the wheels 18 have lost contact with the ground.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   a vehicle body having a roof and a floor;
   a seat assembly having a lower seat portion and a seatback portion operatively connected to the lower seat portion, said seat assembly being mounted with respect to the floor and being selectively movable from a first position to a second position in which the seat assembly is farther from the roof than in the first position;
   at least one actuator being operatively connected to the seat assembly and being selectively activatable to cause the seat assembly to move from the first position to the second position;
   a rollover detection system operatively connected to said at least one actuator, configured to detect at least one condition indicative of a vehicle rollover, and configured to activate said at least one actuator in response to said at least one condition indicative of a vehicle rollover;
   at least one retention device being characterized by an engaged configuration in which said at least one retention device maintains the seat assembly in the first position, and a disengaged configuration in which said at least one retention device does not maintain the seat assembly in the first position; and
   wherein said at least one actuator is operatively connected to said at least one retention device such that activation of said at least one actuator moves said at least one retention device from the engaged configuration to the disengaged configuration.

2. A vehicle comprising:
   a vehicle body having a roof and a floor;
   a seat assembly having a lower seat portion and a seatback portion operatively connected to the lower seat portion said seat assembly being mounted with respect to the floor and being selectively movable from a first position to a second position in which the seat assembly is farther from the roof than in the first position;
   at least one actuator being operatively connected to the seat assembly and being selectively activatable to cause the seat assembly to move from the first position to the second position;
   a rollover detection system operatively connected to said at least one actuator configured to detect at least one condition indicative of a vehicle rollover, and configured to activate said at least one actuator in response to said at least one condition indicative of a vehicle rollover; and
   a strut assembly having a first member defining a chamber and a second member that is at least partially contained within the chamber such that the first member limits relative movement between the first and second members to linear translation;
   wherein said first member is mounted with respect to one of the floor and the lower seat portion; and
   wherein said second member is mounted with respect to the other of the floor and the lower seat portion.

3. The vehicle of claim 2, further comprising a first retention device being characterized by an engaged configuration in which the first retention device prevents relative movement between the first and second members, and a disengaged configuration in which the first retention device does not prevent relative movement between said first and second members; and
   wherein said at least one actuator is operatively connected to the first retention device such that activation of said at least one actuator moves the first retention device from the engaged configuration to the disengaged configuration.

4. The vehicle of claim 3, wherein the second member defines a cavity;
   wherein the first retention device includes a pin being mounted with respect to the first member and being selectively movable between a retracted position in which the pin does not extend into the cavity, and an extended position in which the pin extends into the cavity; and
   wherein said at least one actuator is operatively connected to the pin such that activation of said at least one actuator moves the pin from the extended position to the retracted position.

5. The vehicle of claim 3, further comprising a second retention device configured to automatically lock the second member with respect to the first member when the seat assembly is in the second position.

6. The vehicle of claim 5, wherein the second retention device includes a split ring;
   wherein the second member defines a first groove that at least partially contains the split ring; and
   wherein the first member defines a second groove that is sufficiently positioned to receive a portion of the split ring when the seat assembly is in the second position.

7. A vehicle comprising:
   a vehicle body having a roof and a floor;
   a seat assembly having a lower seat portion and a seatback portion operatively connected to the lower seat portion, said seat assembly being mounted with respect to the floor and being selectively movable from a first position to a second position in which the seat assembly is farther from the roof than in the first position;
   at least one actuator being operatively connected to the seat assembly and being selectively activatable to cause the seat assembly to move from the first position to the second position; and
   a rollover detection system operatively connected to said at least one actuator, configured to detect at least one condition indicative of a vehicle rollover, and configured to activate said at least one actuator in response to said at least one condition indicative of a vehicle rollover;
   wherein said at least one actuator is configured to transmit a force to the seat assembly when activated; and
   wherein the seat assembly is selectively rotatable with respect to the vehicle body between the first and second positions.

8. The vehicle of claim 7, further comprising at least one retention device configured to automatically lock the seat assembly with respect to the vehicle body when the seat assembly is in the second position.

9. A vehicle comprising:

a vehicle body having a roof and a floor;

a seat assembly having a lower seat portion and a seatback portion operatively connected to the lower seat portion;

a plurality of struts operatively interconnecting the seat assembly and the floor and configured to selectively guide movement of the seat assembly between a first position and a second position in which the seat assembly is farther from the roof than in the first position;

a first retention device configured to releasably support the seat assembly in the first position;

a second retention device configured to lock the seat assembly in the second position; and a rollover detection system operatively connected to said at least one actuator, configured to detect at least one condition indicative of a vehicle rollover, and configured to cause the first retention device to release the seat assembly in response to said at least one condition indicative of a vehicle rollover.

* * * * *